US008813216B2

(12) United States Patent
Bloemeke et al.

(10) Patent No.: US 8,813,216 B2
(45) Date of Patent: Aug. 19, 2014

(54) NETWORK SECURITY PROTECTION

(75) Inventors: William Joseph Bloemeke, Raleigh, NC (US); Reid Anthony Cashion, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1792 days.

(21) Appl. No.: 11/014,312

(22) Filed: Dec. 16, 2004

(65) Prior Publication Data

US 2006/0137004 A1     Jun. 22, 2006

(51) Int. Cl.
*G06F 9/00*     (2006.01)
*H04L 29/06*    (2006.01)

(52) U.S. Cl.
CPC .................................. *H04L 63/0428* (2013.01)
USPC .............. 726/14; 726/2; 726/3; 726/4; 726/8; 726/10; 726/11; 726/12; 726/13; 726/17; 726/21; 726/28; 726/29; 726/30; 713/160; 713/182; 713/184; 713/151; 713/152; 709/217; 709/218; 709/223; 709/224; 709/225; 709/227; 709/228; 709/229; 718/101; 718/102

(58) Field of Classification Search
CPC .................................................... H04I 63/0428
USPC ........... 726/14, 2–4, 8, 11–13, 17, 21, 28–30, 726/6; 713/160, 182, 184, 151, 152, 201; 380/255; 709/217–219, 223–225, 227, 709/228, 229; 718/102, 101
See application file for complete search history.

(56) References Cited

U.S. PATENT DOCUMENTS

| | | | |
|---|---|---|---|
| 5,530,758 A | 6/1996 | Marino, Jr. et al. | |
| 6,202,092 B1* | 3/2001 | Takimoto | 709/225 |
| 6,353,844 B1* | 3/2002 | Bitar et al. | 718/102 |
| 6,681,327 B1* | 1/2004 | Jardin | 713/153 |
| 6,684,329 B1 | 1/2004 | Epstein et al. | |
| 6,690,645 B1* | 2/2004 | Aweya et al. | 370/230 |
| 6,954,220 B1* | 10/2005 | Bowman-Amuah | 715/741 |

(Continued)

OTHER PUBLICATIONS

Alan E. Baratz et al., SNA Networks of Small Systems, IEEE Journal on selected areas in communications, vol. SAC-3, No. 3, May 1985, pp. 416-426.*

(Continued)

*Primary Examiner* — Luu Pham
*Assistant Examiner* — Canh Le
(74) *Attorney, Agent, or Firm* — Yudell Isidore Ng Russell PLLC

(57) ABSTRACT

A method and system for providing security to a Network Job Entry (NJE) network. A first NJE node and a third NJE node are connected by a second NJE node. The second NJE node conducts a security check of NJE packets traveling between the first and third NJE nodes. The security check performed by the second NJE node includes checking the userid of the person or job that sent the NJE packet, as well as the NJE data type. The NJE data type may be classified by the type of operation being performed, such as a batch job, sysout, command, message, as well as what application is being used. In one preferred embodiment, the security check includes checking the security level of the source of the data being transferred, such as a sensitive application. The security check can be based on the size of the data packet, such that excessively large data packets from a particular user are not permitted to be transmitted outside a secure NJE network.

38 Claims, 7 Drawing Sheets

(56) References Cited

U.S. PATENT DOCUMENTS

| | | | |
|---|---|---|---|
| 6,966,059 B1* | 11/2005 | Shetty et al. | 717/172 |
| 7,039,670 B2* | 5/2006 | Hubbard et al. | 709/201 |
| 7,039,714 B1* | 5/2006 | Blakley, III et al. | 709/229 |
| 7,113,994 B1* | 9/2006 | Swift et al. | 709/229 |
| 7,146,403 B2* | 12/2006 | Tock et al. | 709/206 |
| 7,194,554 B1* | 3/2007 | Short et al. | 709/246 |
| 7,461,403 B1* | 12/2008 | Libenzi et al. | 726/24 |
| 2002/0059489 A1* | 5/2002 | Davis et al. | 710/72 |
| 2002/0066026 A1* | 5/2002 | Yau et al. | 713/201 |
| 2002/0186398 A1* | 12/2002 | Ono et al. | 358/1.14 |
| 2003/0033543 A1 | 2/2003 | Hubbard et al. | |
| 2003/0041124 A1* | 2/2003 | Navarre et al. | 709/219 |
| 2004/0036912 A1* | 2/2004 | Liou et al. | 358/1.16 |
| 2004/0039827 A1 | 2/2004 | Thomas et al. | |
| 2004/0098391 A1* | 5/2004 | Robertson et al. | 707/10 |
| 2005/0071679 A1* | 3/2005 | Kiss et al. | 713/201 |
| 2006/0005237 A1* | 1/2006 | Kobata et al. | 726/12 |
| 2006/0010449 A1* | 1/2006 | Flower et al. | 718/102 |
| 2006/0068761 A1* | 3/2006 | Chambers et al. | 455/412.1 |
| 2007/0143598 A1* | 6/2007 | Partridge et al. | 713/160 |

OTHER PUBLICATIONS

Diane P. Pozefsky et al., "SNA's Design for Networking After 18 years IBM's communication architecture for many of its network products has broad capabiltie thanks to continuous enhancements", IEEE network, Nov. 1992, pp. 18-31.*

B. C. Housel and C. J. Scopinich, "SNA distribution Services", IBM System Journal, vol. 22, No. 1983, pp. 319-343.*

R. P. Crabtree, "Job networking", IBM System Journal, vol. 17, No. 3, 1978 pp. 206-220.*

Systems Network Architecture, Format and Protocol Reference Manual: Architecture Logic for LU Type 6.2, IBM; International Business Machines Corporation, Fourth Edition (Dec. 1985); Base Publication No. SC30-3269-3, pp. i-x31.

Systems Network Architecture Format and Protocol Reference Manual: Architecture Logic for LU Type 6.2, IBM Technical Newsletter, No. SN30-3562, Sep. 30, 1988, Replacement Pages for Subject Publication.

Robert N. Smith and Sourav Bhattacharya, A Protocol and Simulation for Distributed Communicating Firewalls, IEEE, 1999, pp. 74-79.

Robert N. Smith and Sourav Bhattacharya, Firewall Replacement in a Large Network Topology, IEEE, 1997, pp. 40-45.

\* cited by examiner

| Origination | Keep? | Comments |
|---|---|---|
| *.* | no | By default, delete work from any unknown node |
| ABC*.* | yes | Accept anything from anyone on an ABC Corporation node |
| NodeX.user1 | yes | Accept work from user1 on NodeX |
| NodeX.user2 | no | Don't accept work from user2 on NodeX |
| NodeX.user3 | yes | Accept work from user3 on NodeX |

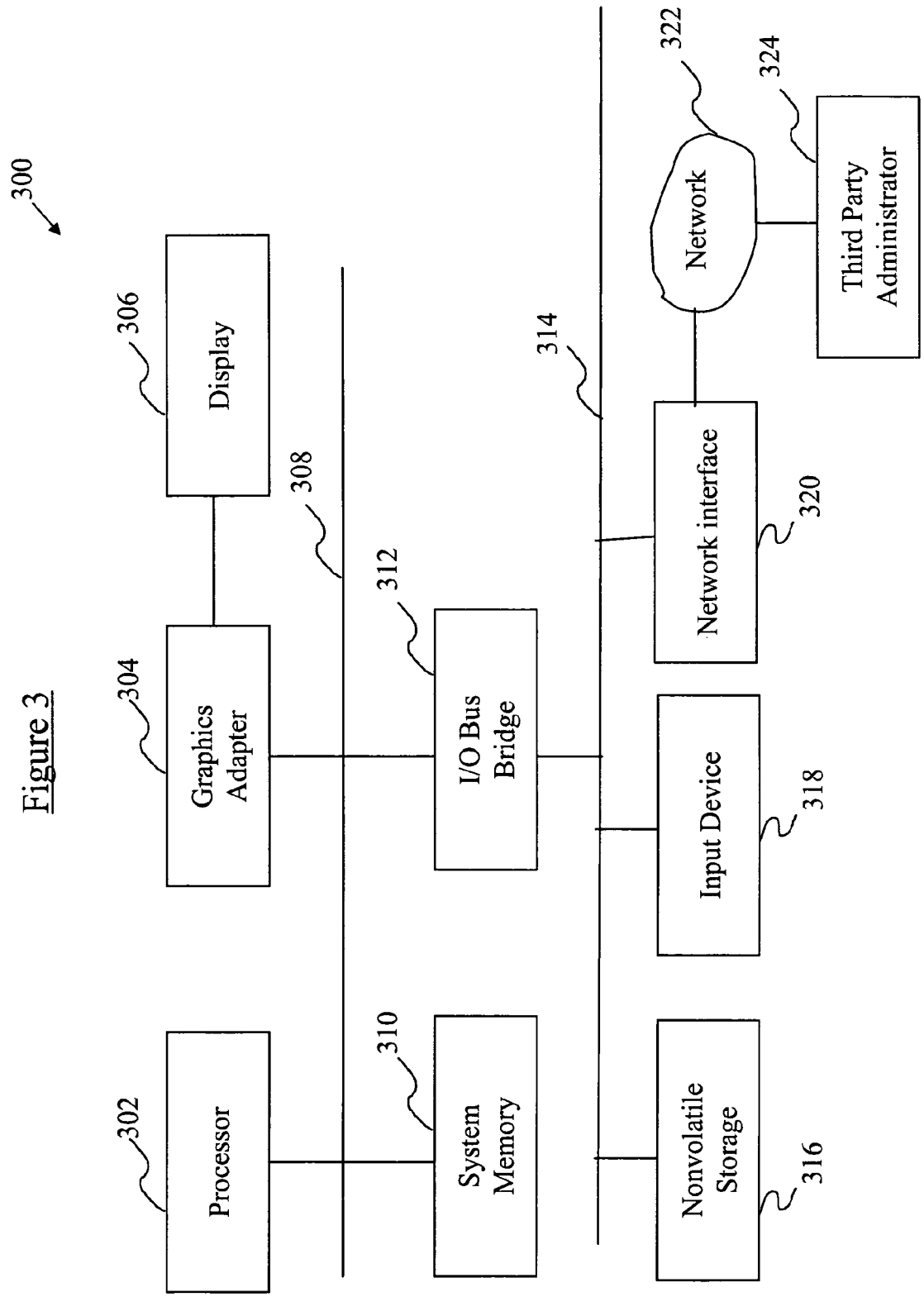

NETWORK SECURITY PROTECTION

BACKGROUND OF THE INVENTION

1. Technical Field

The present invention relates in general to the field of computers, and in particular to networked computers. Still more particularly, the present invention relates to a method and system for controlling communication between a first node in a first network and a second node in a second network.

2. Description of the Related Art

Systems Network Architecture (SNA) is an architecture and set of implementing products for network computing within an enterprise developed by International Business Machines (IBM) or Armonk, N.Y. Details of this architecture are found in "Systems Network Architecture: Format and Protocol Reference Manual—Architecture Logic for LU Type 6.2 (SC30-3269)", published by IBM, and herein incorporated by reference in its entirety. Capable of operating within the SNA architecture is Network Job Entry (NJE), which is a mechanism that allows host computer systems to transfer jobs, output, messages and commands between each other. Each host computer is a multi-user mainframe or midrange computer, the largest of which can support thousands of users. The host computer and its users are defined as a "node" (also called a "complex" or a "system"). Each "user" on the host computer is identified using a unique userid. All work on the computer, such as batch jobs, online transactions, time sharing sessions, system tasks etc., is associated with a specific userid for ownership purposes. Customers typically use their userid to gain access to the computer using client computers or workstations. While userids are used to identify customers or end-users requiring host computer services, they are also used to identify running applications and system tasks.

An NJE network is a group of two or more nodes that communicate with each other. With reference to FIG. 1a, an NJE network 102 is made up of Node A (104), Node B (106), Node C (108), Node D (110), and Node E (112). To become part of NJE network 102, each node's operating system must support an NJE facility (communication utility). Acceptable NJE facilities are JES2 (Job Entry Subsystem, Version 2), JES3 (Job Entry Subsystem, Version 3), RSCS (Remote Spooling Communications Subsystem), VSE/POWER (Virtual Storage Extended/Priority Output Writers, Execution Processors and Input Readers), and AS/400 Communication Utilities. Different nodes may use the same facilities, but are shown using a different named NJE facility in each of the nodes in FIG. 1a.

Nodes can be classified as "originating," "intermediate" or "target" nodes. With reference to FIG. 1b, assume that Node A (104) is sending data to Node D (110) to be processed, with the results printed on Node E (112). Node A, being the node where a user submitted a request to transmit data to another node, is the "originating node." Node D is a target node where a NJE job (a transfer unit that contains data to be processed) is received for execution, and thus is called an "execution node." Node E (112) is a target node where the results of the execution of the NJE job in Node D are sent, and thus Node E is called a "destination node." Nodes B-C (106-108) lie in the path between Node A and Nodes D and E, and thus are called "intermediate nodes."

Intermediate nodes simply pass through NJE data (or jobs) using a function known as "store-and-forward." In the example of nodes shown in FIG. 1b, Node B and Node C do no validation of NJE work (data or jobs) being passed on to Nodes D and E. Thus, any security control of NJE data is only found in the originating node (Node A) and the target nodes (Nodes D and E).

When an NJE network consists of nodes that are all part of the same corporation or institution, then nodes are considered trusted and little or no security is required to control the ability of NJE data to pass through the network. However, sometimes an NJE network includes "semi-trusted" or "untrusted" nodes from outside the corporation. When this happens, the corporation must implement security policies to control unauthorized work from and to the non-corporate node(s).

Consider an NJE network 200 depicted in FIG. 2a. NJE network 200 includes a first node identified as Corporation ABC's NJE network 202, and second and third nodes identified as Node X (204) and Node Y (206). ABCSYS1, ABCSYS2 and ABCSYS3 are trusted nodes (a.k.a., "sub-nodes") within Corporation ABC's NJE network 202. Since all users on the nodes ABCSYS1, ABCSYS2 and ABCSYS3 are part of the Corporation ABC's network 202, there is no need to control NJE data between these nodes. Now, assume that Node X (204) is a vendor supplier for ABC Corporation that has connected to Corporation ABC's NJE Network 202. Node X is not part of the ABC Corporation (and so is not a trusted node), but is considered to be a semi-trusted node, since only certain users on Node X are authorized to send work to ABCSYS1, ABCSYS2, or ABCSYS3. Node Y (206) is connected to Node X (204), and is therefore now also part of NJE network 200, and has access to Corporation ABC's network 202. However, since Node Y is not authorized to send work to ABCSYS1, ABCSYS2, or ABCSYS3, Node Y is considered an "untrusted node".

ABC Corporation's security administrator must implement a security policy to control NJE traffic. The policy must allow authorized users from Node X to send data to ABCSYS1, ABCSYS2, and ABCSYS3. The policy must also delete any work arriving from Node Y. An example of such a policy profile is shown in FIG. 2b. Note that since security profiles can only be established at the originating or destination node according to NJE protocol, the security profile shown in FIG. 2b must be applied to every node (ABCSYS1, ABCSYS2, ABCSYS3) in Corporation ABC's NJE network 202. Similarly, the security administrators for Node X and Node Y would also likely want to set up similar profiles to protect Nodes X and Y from semi/untrusted nodes in Corporation ABC's NJE network 202. In a small configuration such as depicted in FIG. 2a, setting up such profiles in all nodes would require minimal effort. However, if Corporation ABC's NJE network 202 were made up of thousands of nodes supporting many subsidiary corporations (a common scenario), the necessary security administration would likely prohibit any NJE connections outside of Corporation ABC's NJE network 202.

What is needed, therefore, is an improved method and system of security checking that permits NJE data communication between NJE nodes. Preferably, such a method and system would be scalable with minimal adaptation.

SUMMARY OF THE INVENTION

The present invention is thus directed to an improved method and system for providing security to a Network Job Entry (NJE) network. A first NJE node and a third NJE node are connected by a second NJE node. The second NJE node conducts a security check of NJE packets traveling between the first and third NJE nodes. The security check performed by the second NJE node includes checking the userid of the person or job that sent the NJE packet, as well as the NJE data type. The NJE data type may be classified by the type of operation being performed, such as a batch job, sysout, command, or message. In one preferred embodiment, the security check includes checking the security level of the source of the data being transferred, such as a sensitive application. The security check can be based on the size of the data packet, such that excessively large data packets from a particular user are not permitted to be transmitted outside a secure NJE network.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 depict an exemplary computer system which can be used as part or all of a node in a NJE network that is incorporating the present invention;

DETAILED DESCRIPTION OF THE PREFERRED EMBODIMENT

Figure 1A:
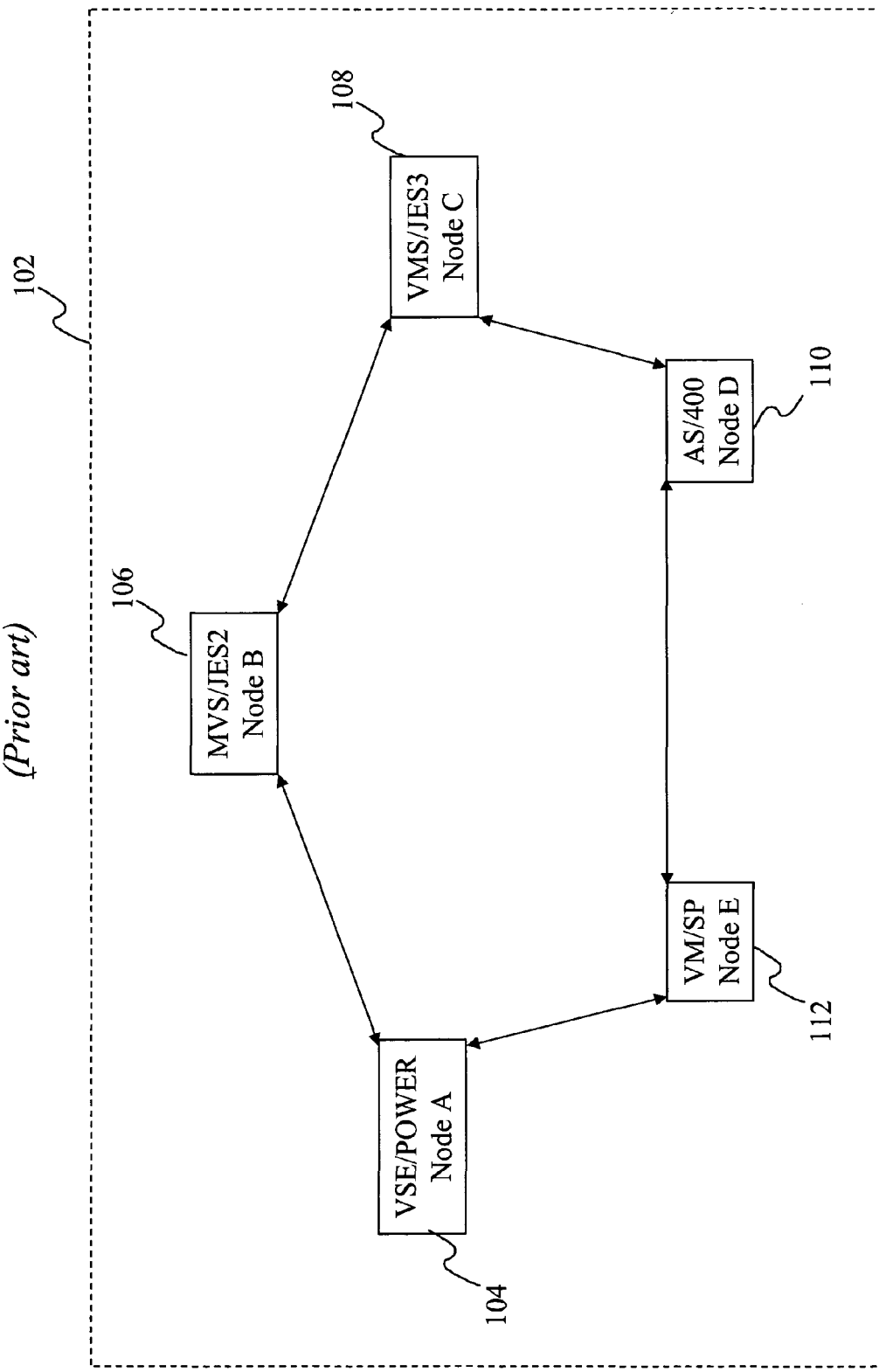
FIGS. 1a-b depict a prior art Network Job Entry (NJE) network.
Figure 1B:
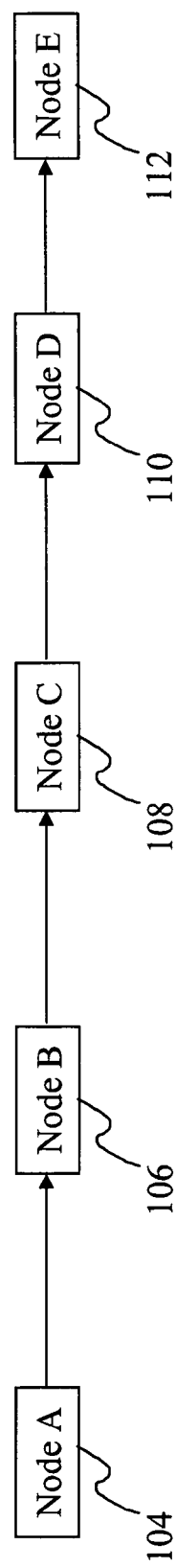
Figures 2A, 2B:
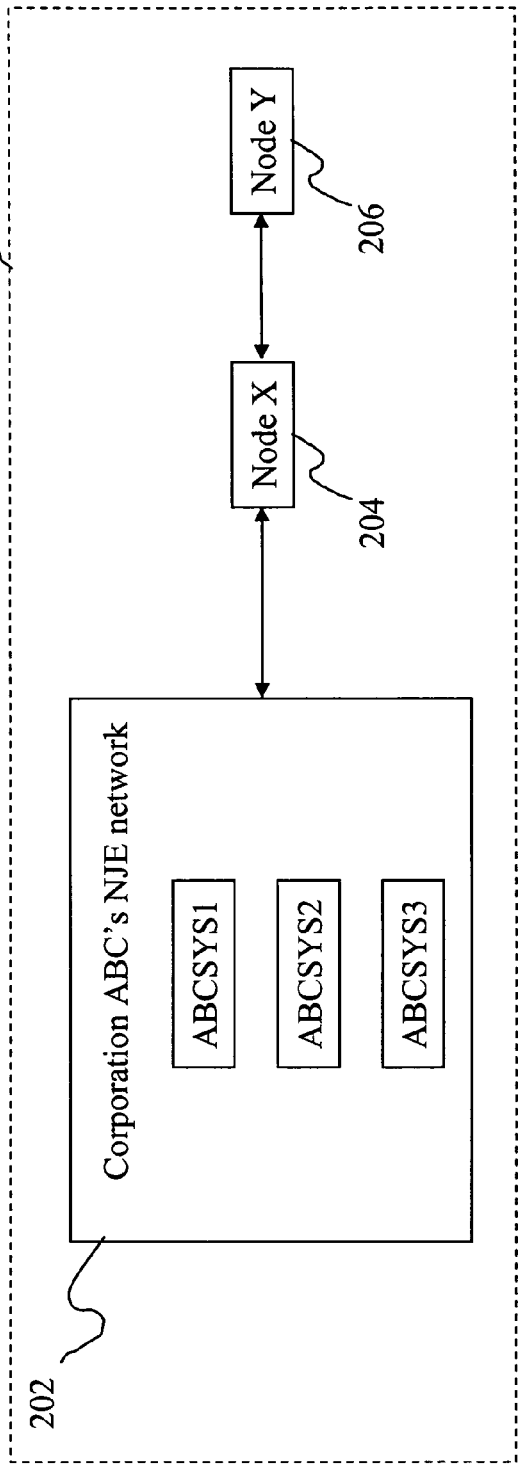
FIGS. 2a-b illustrate a prior art security protocol for the NJE network implemented at an originating or target node.

With reference now to the FIG. 3, there is depicted a block diagram of an exemplary data processing system that may be used by a server or client user in an NJE node in accordance with the present invention. Data processing system 300 may be, for example, one of the models of personal or server computers available from International Business Machines Corporation of Armonk, N.Y. Data processing system 300 includes a central processing unit (CPU) 302, which is connected to a system bus 308. In the exemplary embodiment, data processing system 300 includes a graphics adapter 304 also connected to system bus 308, for providing user interface information to a display 306.

Also connected to system bus 308 are a system memory 310 and an input/output (I/O) bus bridge 312. I/O bus bridge 312 couples an I/O bus 314 to system bus 308, relaying and/or transforming data transactions from one bus to the other. Peripheral devices such as nonvolatile storage 316, which may be a hard disk drive, and input device 318, which may include a conventional mouse, a trackball, or the like, is connected to I/O bus 314.

Communication with processing system 300 is via a network interface 320, which is preferably a Network Interface Card (NIC) or similar logic known to those skilled in the art of network communication. Network interface 320 couples to a network 322 (e.g., the Internet, an enterprise Wide Area Network WAN, et al.) to a third party administrator 324. Third party administrator is a computer system operable by a third party, preferably for implementing the invention described below for a customer (enterprise, corporation, node, etc.)

The exemplary embodiment shown in FIG. 3 is provided solely for the purposes of explaining the invention and those skilled in the art will recognize that numerous variations are possible, both in form and function. For instance, data processing system 300 might also include a compact disk read-only memory (CD-ROM) digital versatile disk (DVD) drive, a sound card and audio speakers, and numerous other optional components. All such variations are believed to be within the spirit and scope of the present invention.

Figure 4A:
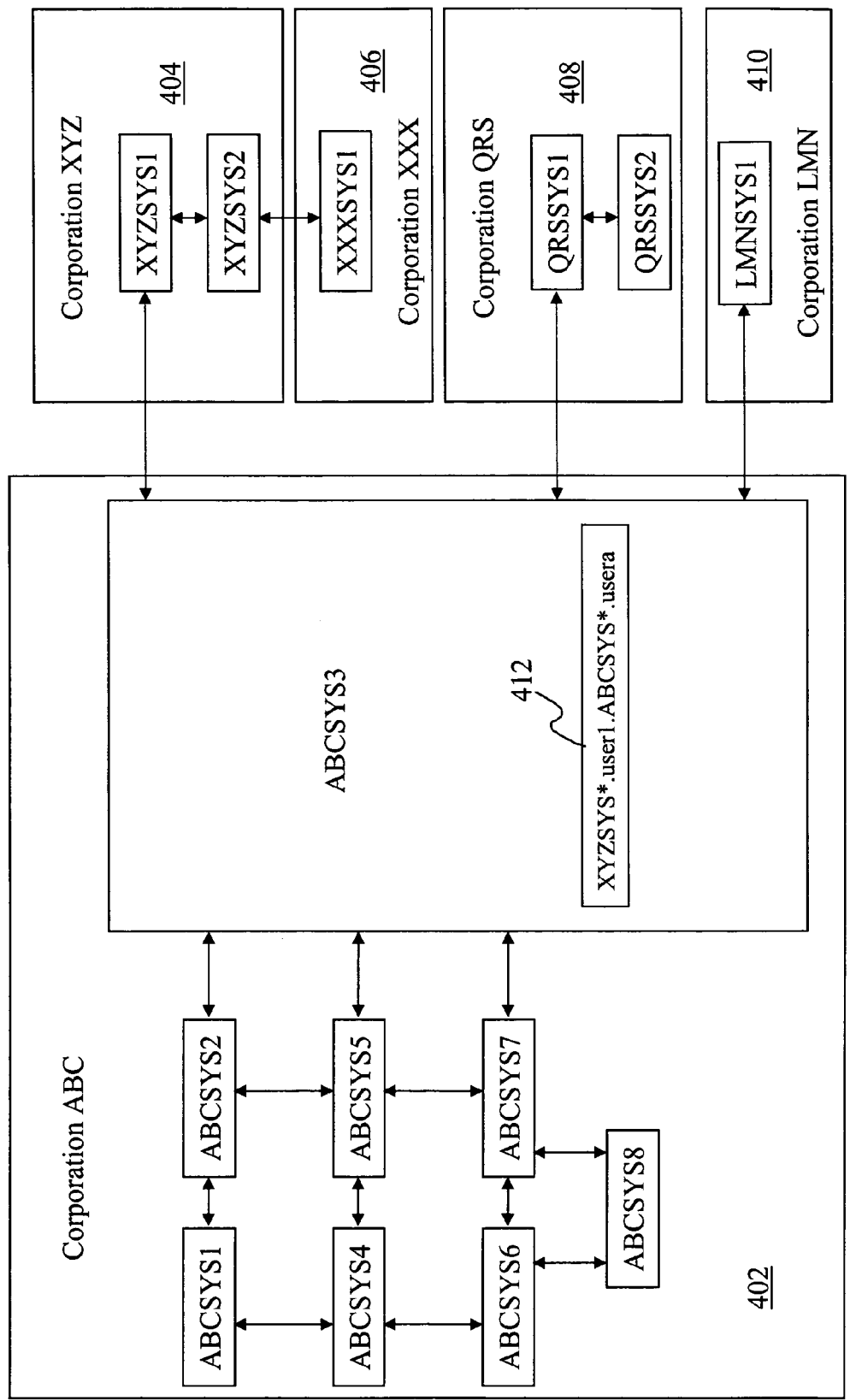
FIGS. 4a-b illustrate an NJE network incorporating an inventive gateway node.

With reference now to FIG. 4, there is depicted a block diagram of NJE networks for Corporations ABC, XYZ, XXX, QRS and LMN, respectively numbered 402 through 410. While each corporate network may contain between one node or thousands of nodes or more (with each node having a host server and multiple client computers), only an exemplary number of nodes are depicted. For example, Corporation ABC's NJE network 402 contains eight nodes, labeled ABC-SYS1-8, while Corporation XYZ's NJE network 404 and Corporation QRS's NJE network 408 each contain two nodes, and Corporation XXX's NJE network 406 and Corporation LMN's NJE network 410 each have only a single node.

The gateway node for Corporation ABC's NJE network 402 is the ABCSYS3 node, which preferably is a node that acts only as an intermediate node, performing only store-and-forward functions to communicate NJE data to and from the rest of the nodes in the Corporation ABC's NJE network 402. Thus, communication between Corporation ABC's NJE network 402 and Corporation XYZ's NJE network 404, Corporation QRS's NJE network 408, and Corporation LMN's NJE network 410 are directly through the ABCSYS3 node. Communication between Corporation ABC's NJE network 402 and Corporation XXX's NJE network 406 are via Corporation XYZ's NJE network 404, whose nodes XYZSYS1 and XYZSYS2 function in such a circumstance only as store-and-forward intermediate nodes.

The gateway node ABCSYS3 includes a security profile 412. Security profile 412 contains the protocol required for a NJE data message (job or data) to enter or leave Corporation ABC's NJE network 402. For example, as shown in FIG. 4, the only NJE data messages that can pass back and forth through ABCSYS3 to an outside NJE network are those NJE messages that are from any node in Corporation XYZ's NJE network 404 ("XYZSYS*") but only from a particular person or job identified as "user1", whose NJE message is addressed to any node in the Corporation ABC's NJE network 402 ("ABCSYS*"), but only those addressed to a particular person or job identified as "usera." (Note that "user1" and "usera" are examples of userid's, which are defined as either identifiers for specific persons or specific jobs.) Any NJE message not meeting these parameters will not be allowed to enter or leave the Corporation ABC's NJE network 402. Note that by having ABCSYS3 as a single gateway, the rest of the nodes in the Corporation ABC's NJE network 402 do not have to implement security profiles.

An additional feature of the described gateway is the ability to control groups of users with a single profile. The grouping can be based on the users' security classification, their group membership, or session type (e.g. all time sharing users). For example, if a business relationship exists between Corporation ABC and Corporation XYZ such that a group of ABC employees provide Information Technology (I/T) services for XYZSYS1 and XYZSYS2, a single profile could be used on ABCSYS3 to allow the ABC employees to send data to XYZ-SYS1 and XYZSYS2.

As noted, security profile 412 can be based on the session type. The session type refers to the environment that created the NJE data that is (or is attempted to be) transmitted. Thus, security profile 412 can filter NJE data traffic according to whether it was created as a system task, a batch job, by a time sharing user, etc.

Besides monitoring for authorized origination and destination nodes and userids, security profile 412 can also monitor the type of NJE data, including batch jobs, sysout, system commands, and messages. For example, in security profile 412, user1 can be allowed to send sysout to usera, but he can also be prevented from sending messages to usera or commands to nodes in XYZ's network 404.

Likewise, the ABCSYS3 node may prohibit the exit from or entrance to Corporation ABC's NJE network 402 of any data that is part of a named job. For example, a job named "Batch Job 987" may be allowed to be passed back and forth to only specified outside node(s) and/or userid(s).

Additionally, the gateway node provides the capability to filter NJE sysout based on sysout characteristics such as line count, class, and writer id. Furthermore, the gateway node can limit the size of data packets being allowed to enter or leave an NJE network according to a pre-determined maximum (or minimum) size limit.

The gateway node also provides the functionality to send a failure message to the originator when the security profile 412 disallow the file transfer.

Note that if the security profile 412 is based on application type or job number, then the top Application Layer 7 of the Seven Layer Open System Interconnection (OSI) Model (which is herein incorporated by reference in its entirety) is monitored. Thus, security profile 412 may or may not monitor NJE node or physical addresses in lower layers of the OSI mode, if monitoring for application types or job numbers, then the top Application Layer 7 must be monitored.

While security profile 412 is depicted as a "positive" parameter (i.e., any NJE data from usera on node ABCSYS* can communicate with an outside node), the security profile 412 can also be defined in a "negative" manner (i.e., any NJE data from usera may NOT be communicated with an outside node).

As noted above, the present invention is preferably directed to NJE networks, whose functions, formats, abilities, limitations and protocols are described in "Network Job Entry Formats and Protocol, Fourth Edition, Document Number SC23-0070-03" published by International Business Machines Corporation, June 1998, which is herein incorporated by reference in it entirety.

The NJE networks described above can consist of up to 32K computer systems (or complexes) running either AS/400, JES2, JES3, VM/RSCS, or VSE/POWER. Therefore, the following documents are herein incorporated by reference in their entirety: "AS/400 VM/MVS Bridge Configuration and Operations, Document Number GG24-4382-00," Published by the International Technical Support Organization, Raleigh Center of International Business Machines Corporation, November, 1994; "JES2 Introduction, Document Number GC28-1794-02, Third Edition," Published by International Business Machines Corporation, September, 1997; "Virtual Machine Remote Spooling Communications Subsystem Networking General Information, Version 3, Release 2, Fourth Edition, Document Number GH24-5218-03," Published by International Business Machines Corporation, July 1999; and "VSE/POWER and OS/400 NJE Configuration Examples, Document Number GG24-4259-00," Published by International Business Machines Corporation, June 1994.

Figure 4B:
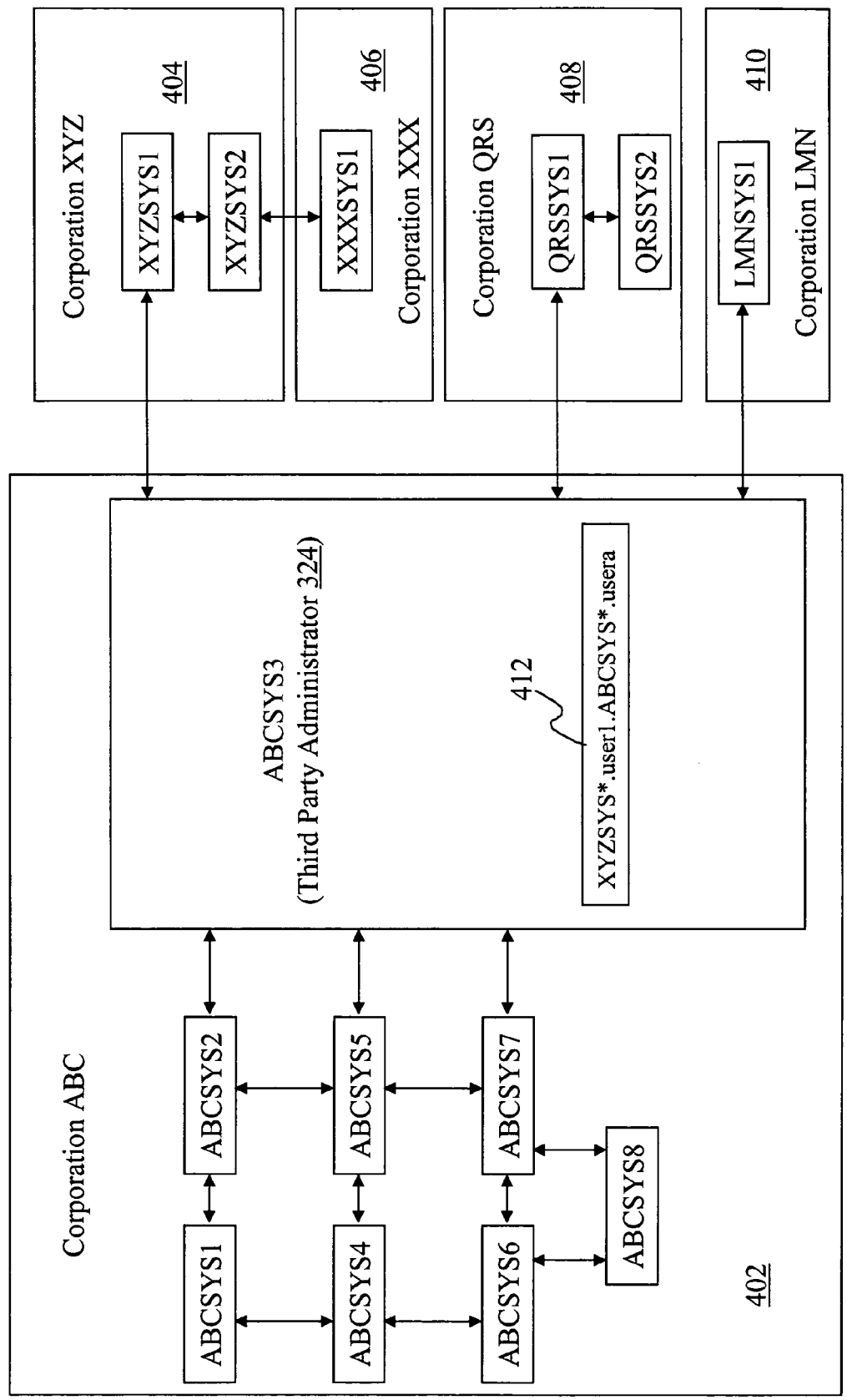
Figure 5:
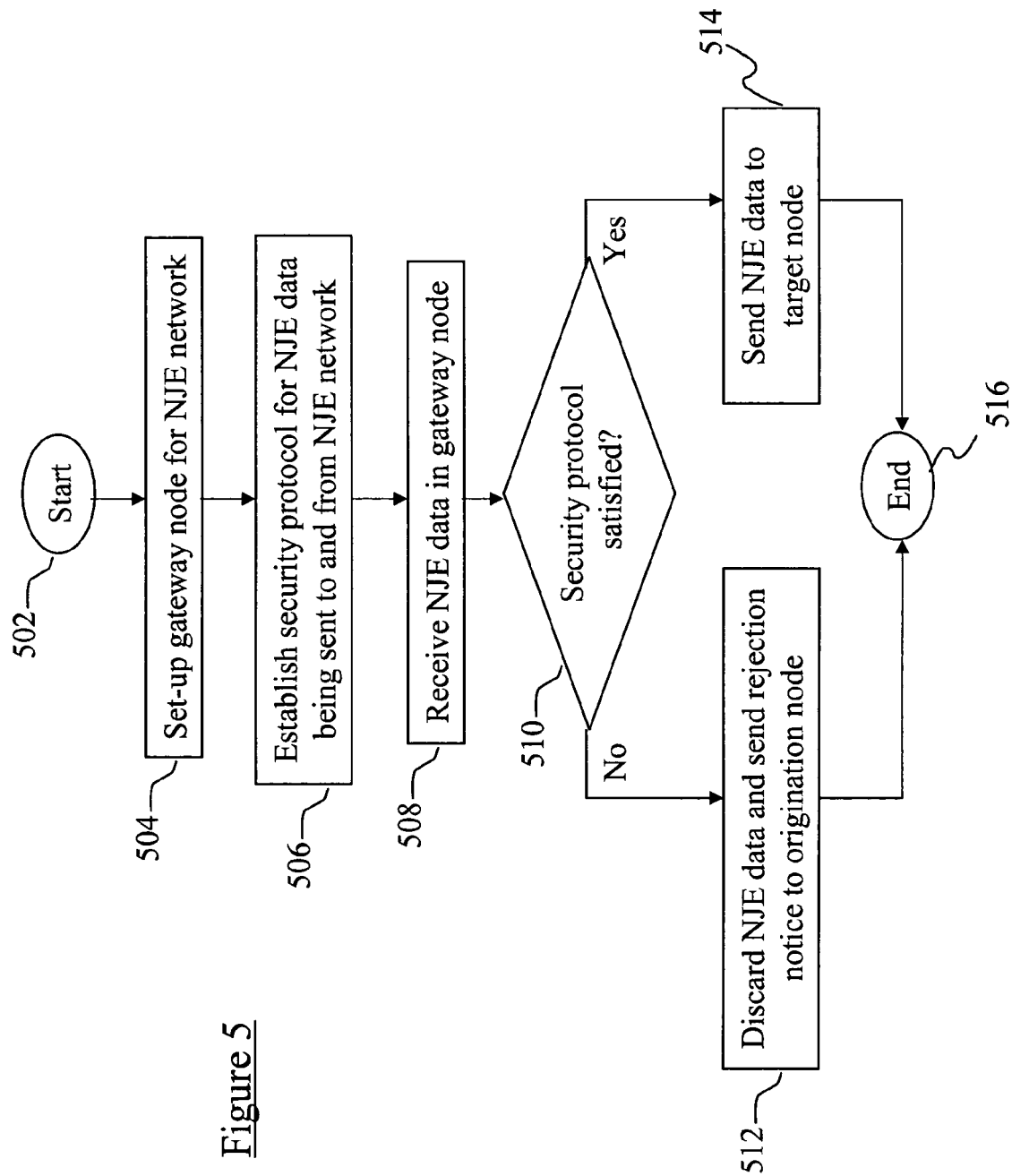
FIG. 5 is a flow-chart of steps taken in a preferred embodiment of the present invention.

With reference now to FIG. 5, exemplary steps taken by the present invention are depicted. After originating block 502, a gateway node is set up for an NJE network (block 504), as described above in FIG. 4 for node ABCSYS3. This gateway node is strictly a store-and-forward node for all NJE connections outside the NJE network being protected. As described in block 506, a security protocol (such as security protocol 412) is set up in the gateway node. As described above, this security protocol can be designed to monitor and control which types of data, such as batch jobs, sysout, commands, messages, applications and databases, can enter or leave the protected NJE network. If, after receiving an NJE data at the gate way node (block 508), the security protocol is not satisfied, then the NJE data is rejected (discarded), and a notification message (block 512) is sent to the originating node (whether internal or external) stating that the NJE data message was blocked. If, however, the security protocol is satisfied (block 514), then the NJE data message is sent to the target node, and the process ends (terminator block 516).

The invention described above may be utilized internally by an enterprise's own I/T department. In a preferred embodiment, however, the above described invention is useful in allowing a third party to administer security profiles for multiple enterprises, particularly enterprises that communicate with each other. With reference to FIG. 4b for example, the gateway node ABCSYS3 may actually be a remote logic operated by third party administrator 324 (such as shown in FIG. 3). This remote administrator is thus able to use the present invention to remotely define and implement security profile 412 as well as any other security profile for other enterprises (e.g., corporations) to which the third party administrator 324 is authorized in a manner described above. Of course, third party administrator 324 could implement the same described system from one of the customer's own nodes, if so desired.

It should be understood that at least some aspects of the present invention may alternatively be implemented in a program product. Programs defining functions on the present invention can be delivered to a data storage system or a computer system via a variety of computer-readable storage media, which include, without limitation, non-writable storage media (e.g., CD-ROM) and writable storage media (e.g., a floppy diskette, hard disk drive, read/write CD ROM, optical media). It should be understood, therefore that such computer-readable storage media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present invention thus provides a method and system for dedicating an intermediate NJE node as a security protocol node. Since the NJE protocol allows for security definitions only at "terminal" nodes, the security protocol node (e.g., ABCSYS3) is a proxy terminal node for the rest of the nodes in the Corporation ABC's NJE network 402. Likewise, other NJE networks can have similar security protocol nodes that function in a similar manner as described for the ABCSYS3 node of Corporation ABC's NJE network 402.

While the invention has been particularly shown and described with reference to a preferred embodiment, it will be understood by those skilled in the art that various changes in form and detail may be made therein without departing from the spirit and scope of the invention.

What is claimed is:

1. A method of security protection for a first computer and a second computer having hardware and software to execute a network job entry (NJE) job to generate NJE data for the first computer, the method comprising the steps of:
   intercepting, by a third computer, a first NJE message sent from the first computer addressed to the second computer;
   determining, by the third computer, whether the second computer is authorized to receive the first NJE message based in part on whether the first NJE message requests a batch job to be performed by the second computer in response to intercepting the first NJE message sent from the first computer addressed to the second computer;
   sending, by the third computer, the first NJE message to the second computer in response to determining that the second computer is authorized to receive the first NJE message;
   determining, by the third computer in response to the third computer receiving from the second computer a second NJE message that is addressed to the first computer and that contains first NJE data generated by the second computer in response to the first NJE message, whether (a) a batch job identifier (ID) included by the second computer in the second NJE message is permitted by a security profile of the third computer to communicate with the first computer (b) the first NJE data is batch job data, and (c) the first computer is authorized to receive the first NJE data from the second computer based on a security level of a source of the first NJE data; and
   sending, by the third computer, the first NJE data to the first computer in response to all of (a) and (b) and (c) being true.

2. The method of claim 1, wherein:
   the first computer and a plurality of client computers reside on a same, local network; and
   further comprising the step of implementing, by the third computer, a security protocol that restricts communication of the second NJE message from the second computer to only the first computer of the local network.

3. The method of claim 2, wherein:
   the third computer belongs to intermediary set of computers including the third computer;
   further comprising the step of implementing, by the intermediary set of computers, a security protocol that restricts communication of the second NJE message from the second computer targeting the intermediary set of computers to only the third computer of the intermediary set of computers.

4. The method of claim 1, and further comprising:
   monitoring, by the third computer, for the data type of the first Network Job Entry (NJE) data at an Application Layer 7 of a network connection between the second computer and the third computer.

5. The method of claim 1, and further comprising:
   preventing, by the third computer, a transmission of a data packet, between the second and first computers, that exceeds a pre-determined size.

6. The method of claim 1, and further comprising serving, by the third computer, as a proxy terminal node for the second computer.

7. The method of claim 1, wherein:
   the second computer belongs to an execution node; and
   the method further comprises sending, by the second computer, the second NJE message to the third computer via the first network connection without applying Network Job Entry (NJE) security.

8. The method of claim 7, wherein:
   the second and third computers belong to an enterprise including a plurality of nodes, the plurality of nodes including the execution node;
   the method further comprises:
   serving, by the third computer, as a gateway for the plurality of nodes to a network external to the enterprise; and
   implementing, by the third computer, a security protocol on Network Job Entry (NJE) messages in lieu of the plurality of nodes implementing NJE security.

9. The method of claim 1, wherein:
   the third computer belongs to an intermediary node; and
   the method further comprises performing, by the intermediary node, store-and-forward operations for NJE messages and refraining from serving as an execution node or destination node.

10. The method of claim 1, and further comprising determining, by the third computer, whether the first computer is authorized to receive the first NJE data from the second computer based on a source database of the first NJE data and sending, by the third computer, the first NJE data to the first computer only in response to a determination that the first computer is authorized to receive the first NJE data.

11. The method of claim 1, and further comprising determining, by the third computer, whether the first computer is authorized to receive the first NJE data from the second computer based on an application program for which the first NJE data is formatted and sending, by the third computer, the first NJE data to the first computer only in response to a determination that the first computer is authorized to receive the first NJE data.

12. The method of claim 1, and further comprising determining, by the third computer, whether the first computer is authorized to receive the first NJE data from the second computer based on a userid of a person that requested the second computer to send the second NJE message and sending, by the third computer, the first NJE data to the first computer only in response to a determination that the first computer is authorized to receive the first NJE data.

13. The method of claim 1, wherein the batch job ID includes a batch job name.

14. The method of claim 1, wherein:
   the third computer receives the first NJE message from the first computer and sends the first NJE data to the first computer via a first network connection; and
   the third computer receives the second NJE message via a different second network connection.

15. A computer program product for security protection for a first computer and a second computer having hardware and software to execute a network job entry (NJE) job to generate NJE data for the first computer, the computer program product comprising:
   one or more computer-readable storage devices and program instructions stored on the one or more storage devices, the program instructions comprising:
   program instructions to intercept, by the third computer, a first NJE message sent from the first computer addressed to the second computer;
   program instructions to determine, by the third computer, whether the second computer is authorized to receive the first NJE message based in part on whether the first NJE message requests a batch job to be performed by the second computer in response to intercepting the first NJE message sent from the first computer addressed to the second computer;
   program instructions to send, by the third computer, the first NJE message to the second computer in response to determining that the second computer is authorized to receive the first NJE message; and program instructions to determine, by the third computer in response to the third computer receiving from the second computer a second NJE message that is addressed to the first computer and that contains first NJE data generated by the second computer in response to the first NJE message, whether (a) a batch job identifier (ID) included by the second computer in the second NJE message is permitted by a security profile of the third computer and (b) a data type of the first NJE data is batch job data, and (c) the first computer is authorized to receive the first NJE data from the second computer based on a security level of a source of the first NJE data; and program instructions to send, by the third computer, the first NJE data to the first computer in response to all of (a) and (b) and (c) being true.

16. The computer program product of claim 15, wherein: the first computer and a plurality of client computers reside on a same, local network; and further comprising program instructions, stored on the one or more storage devices, to implement, by the third computer, a security protocol that restricts communication of the second NJE message from the second computer to only the first computer of the local network.

17. The computer program product of claim 16, wherein: the third computer belongs to intermediary set of computers including the third computer;

further comprising program instructions, stored on the one or more storage devices, to implement, by the intermediary set of computers, a security protocol that restricts communication of the second NJE message from the second computer targeting the intermediary set of computers to only the third computer of the intermediary set of computers.

18. The computer program product of claim 15, further comprising program instructions, stored on the one or more storage devices, to monitor, by the third computer, for the data type of the first Network Job Entry (NJE) data at an Application Layer 7 of a network connection between the second computer and the third computer.

19. The computer program product of claim 15, further comprising program instructions, stored on the one or more storage devices, to prevent, by the third computer, a transmission of a data packet, between the second and first computers, that exceeds a pre-determined size.

20. The computer program product of claim 15, further comprising program instructions, stored on the one or more storage devices, to serve, by the third computer, as a proxy terminal node for the second computer.

21. The computer program product of claim 15, wherein: the second and third computers belong to an enterprise including a plurality of nodes, the plurality of nodes;

further comprising program instructions, stored on the one or more storage devices, to serve, by the third computer, as a gateway for the plurality of nodes to a network external to the enterprise and to implement, by the third computer, a security protocol on Network Job Entry (NJE) messages in lieu of the plurality of nodes implementing NJE security.

22. The computer program product of claim 15, wherein: the third computer belongs to an intermediary node; and further comprising program instructions, stored on the one or more storage devices, to perform, by the intermediary node, store-and-forward operations for NJE messages and to refrain from serving as an execution node or destination node.

23. The computer program product of claim 15, further comprising program instructions, stored on the one or more storage devices, to determine, by the third computer, whether the first computer is authorized to receive the first NJE data from the second computer based on a source database of the first NJE data and to send, by the third computer, the first NJE data to the first computer only in response to a determination that the first computer is authorized to receive the first NJE data.

24. The computer program product of claim 15, further comprising program instructions, stored on the one or more storage devices, to determine, by the third computer, whether the first computer is authorized to receive the first NJE data from the second computer based on an application program for which the first NJE data is formatted and to send, by the third computer, the first NJE data to the first computer only in response to a determination that the first computer is authorized to receive the first NJE data.

25. The computer program product of claim 15, further comprising program instructions, stored on the one or more storage devices, to determine, by the third computer, whether the first computer is authorized to receive the first NJE data from the second computer based on a userid of a person that requested the second computer to send the second NJE message and to send, by the third computer, the first NJE data to the first computer only in response to a determination that the first computer is authorized to receive the first NJE data.

26. The computer program product of claim 15, wherein the batch job ID includes a batch job name.

27. A computer system for security protection for a first computer and a second computer having hardware and software to execute a network job entry (NJE) job to generate NJE data for the first computer, the computer system comprising:

one or more processors, one or more computer-readable memories, one or more computer-readable storage devices, and program instructions stored on the one or more storage devices for execution by the one or more processors via at least one of the one or more memories, the program instructions comprising:

program instructions to intercept, by the third computer, a first NJE message sent from the first computer addressed to the second computer;

program instructions to determine, by the third computer, whether the second computer is authorized to receive the first NJE message based in part on whether the first NJE message requests a batch job to be performed by the second computer in response to intercepting the first NJE message sent from the first computer addressed to the second computer;

program instructions to send, by the third computer, the first NJE message to the second computer in response to determining that the second computer is authorized to receive the first NJE message; and program instructions to determine, by the third computer in response to the third computer receiving from the second computer a second NJE message that is addressed to the first computer and that contains first NJE data generated by the second computer in response to the first NJE message, whether (a) a batch job identifier (ID) included by the second computer in the second NJE message is permitted by a security profile of the third computer and (b) a data type of the first NJE data is batch job data, and (c) the first computer is authorized to receive the first NJE data from the second computer based on a security level of a source of the first NJE data; and program instructions to send, by the third computer, the first NJE data to the first computer in response to all of (a) and (b) and (c) being true.

28. The computer system of claim 27, wherein:
the first computer and a plurality of client computers reside on a same, local network; and
further comprising program instructions, stored on the one or more storage devices for execution by the one or more processors via at least one of the one or more memories, to implement, by the third computer, a security protocol that restricts communication of the second NJE message from the second computer to only the first computer of the local network.

29. The computer system of claim 28, wherein:
the third computer belongs to intermediary set of computers including the third computer;
further comprising program instructions, stored on the one or more storage devices for execution by the one or more processors via at least one of the one or more memories, to implement, by the intermediary set of computers, a security protocol that restricts communication of the second NJE message from the second computer targeting the intermediary set of computers to only the third computer of the intermediary set of computers.

30. The computer system of claim 27, further comprising program instructions, stored on the one or more storage devices for execution by the one or more processors via at least one of the one or more memories, to monitor, by the third computer, for the data type of the first Network Job Entry (NJE) data at an Application Layer 7 of a network connection between the second computer and the third computer.

31. The computer system of claim 27, further comprising program instructions, stored on the one or more storage devices for execution by the one or more processors via at least one of the one or more memories, to prevent, by the third computer, a transmission of a data packet, between the second and first computers, that exceeds a pre-determined size.

32. The computer system of claim 27, further comprising program instructions, stored on the one or more storage devices for execution by the one or more processors via at least one of the one or more memories, to serve, by the third computer, as a proxy terminal node for the second computer.

33. The computer system of claim 27, wherein:
the second and third computers belong to an enterprise including a plurality of nodes, the plurality of nodes;
further comprising program instructions, stored on the one or more storage devices for execution by the one or more processors via at least one of the one or more memories, to serve, by the third computer, as a gateway for the plurality of nodes to a network external to the enterprise and to implement, by the third computer, a security protocol on Network Job Entry (NJE) messages in lieu of the plurality of nodes implementing NJE security.

34. The computer system of claim 27, wherein:
the third computer belongs to an intermediary node; and
further comprising program instructions, stored on the one or more storage devices for execution by the one or more processors via at least one of the one or more memories, to perform, by the intermediary node, store-and-forward operations for NJE messages and to refrain from serving as an execution node or destination node.

35. The computer system of claim 27, further comprising program instructions, stored on the one or more storage devices for execution by the one or more processors via at least one of the one or more memories, to determine, by the third computer, whether the first computer is authorized to receive the first NJE data from the second computer based on a source database of the first NJE data and to send, by the third computer, the first NJE data to the first computer only in response to a determination that the first computer is authorized to receive the first NJE data.

36. The computer system of claim 27, further comprising program instructions, stored on the one or more storage devices for execution by the one or more processors via at least one of the one or more memories, to determine, by the third computer, whether the first computer is authorized to receive the first NJE data from the second computer based on an application program for which the first NJE data is formatted and to send, by the third computer, the first NJE data to the first computer only in response to a determination that the first computer is authorized to receive the first NJE data.

37. The computer system of claim 27, further comprising program instructions, stored on the one or more storage devices for execution by the one or more processors via at least one of the one or more memories, to determine, by the third computer, whether the first computer is authorized to receive the first NJE data from the second computer based on a userid of a person that requested the second computer to send the second NJE message and to send, by the third computer, the first NJE data to the first computer only in response to a determination that the first computer is authorized to receive the first NJE data.

38. The computer system of claim 27, wherein the batch job ID includes a batch job name.

* * * * *